(12) United States Patent
Seto et al.

(10) Patent No.: US 6,399,712 B1
(45) Date of Patent: *Jun. 4, 2002

(54) POLYMER BOUND 2,2,6,6,-PIPERIDINYL DERIVATIVES

(75) Inventors: Nobuo Seto; Takayoshi Kamio, both of Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/522,611

(22) Filed: Mar. 10, 2000

(30) Foreign Application Priority Data

Mar. 12, 1999 (JP) ............................................. 11-066922

(51) Int. Cl.⁷ ........................... C08F 8/00; C08F 212/14; C08F 226/00
(52) U.S. Cl. ................................ 525/327.1; 525/326.7; 525/326.9; 525/328.5; 525/359.2; 525/375
(58) Field of Search ........................... 525/327.1, 359.2, 525/326.7, 326.9, 328.5, 375

(56) References Cited

U.S. PATENT DOCUMENTS 6,106,991 A * 8/2000 Taguchi et al. ............. 430/216
6,268,105 B1 * 7/2001 Arakatsu et al. ............ 430/203

* cited by examiner

*Primary Examiner*—D. R. Wilson
(74) *Attorney, Agent, or Firm*—Birch, Stewart, Kolasch & Birch, LLP

(57) ABSTRACT

A polymer compound is provided comprising at least one of the monomer units represented by the following formula (A) or formula (B):

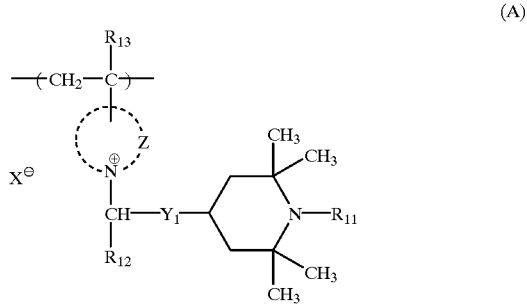

(A)

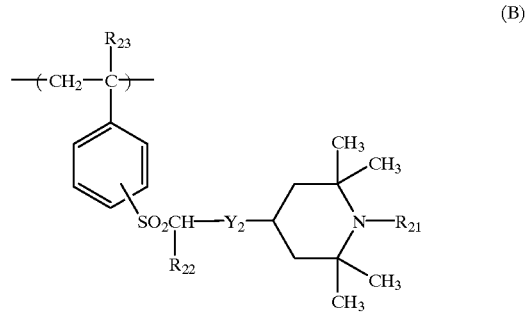

(B)

wherein $R_{11}$ and $R_{21}$ each represents a hydrogen atom, an oxy radical group, an alkyl group, an alkenyl group, an alkoxy group or an acyl group; $R_{12}$ and $R_{22}$ each represents a hydrogen atom or an alkyl group; $Y_1$ and $Y_2$ each represents $\leftarrow$CONR$_4$—, $\leftarrow$COO— or $\leftarrow$CH(OH)CH$_2$O—; $X^-$ represents a chlorine ion, a bromine ion, an iodine ion or a hydroxy ion; Z represents an atom group which together with the nitrogen atom forms a 5- to 7-membered heteroring; $R_{13}$ and $R_{23}$ each represents a hydrogen atom, a methyl group, an ethyl group or a halogen atom; $R_4$ represents a hydrogen atom or an alkyl group having 1 to 4 carbon atoms; and $\leftarrow$ represents a bond to the main chain side of the polymer.

16 Claims, 4 Drawing Sheets

COMPOUND 2 (KBr)

COMPOUND 6 (KBr)

COMPOUND 10 (KBr)

POLYMER BOUND 2,2,6,6,-PIPERIDINYL DERIVATIVES

FIELD OF THE INVENTION

The present invention relates to a novel polymer compound comprising 2,2,6,6-tetramethylpiperidine derivative-bonded monomer unit. More specifically, it relates to a novel polymer compound comprising 2,2,6,6-tetramethylpiperidine derivative-bonded monomer unit useful as an antioxidant for a dye-fixing element and a silver halide photosensitive material.

BACKGROUND OF THE INVENTION

It has been well known that a dye, a dyestuff or a polymer substance (for example, rubber, plastic, etc.) is deteriorated by an oxidation reaction with which oxygen in air is concerned. Therefore, various deterioration prevention agents have been developed. As these antioxidants, various compounds such as phenols, hydroquinones, etc. have been known.

These conventional deterioration prevention agents, however, are not satisfactory in their performance as deterioration prevention agents of a dyestuff, a dye and a synthetic dye. Thus, the development of a new antioxidant has been desired. While, as a polymer compound having 2,2,6,6-tetramethylpiperidine derivative structure, for example, the compound described in JP-B-58-45696 (The term "JP-B" as used herein means an "examined Japanese patent publication") can be mentioned. The compound disclosed in this reference, however, was not assured to have sufficient stability and deterioration prevention effect and, therefore, the compound was desired to be improved.

SUMMARY OF THE INVENTION

An object of the present invention is to provide a novel polymer compound comprising 2,2,6,6-tetramethylpiperidine derivative-bonded monomer unit.

Another object of the present invention is to provide a novel polymer compound comprising 2,2,6,6-tetramethylpiperidine derivative-bonded monomer unit useful as a deterioration and fading prevention agent of a dyestuff and a dye.

The present inventors have conducted extensive study and research effort. As the result, the present inventors found a polymer compound comprising 2,2,6,6-tetramethylpiperidine derivative-bonded monomer unit represented by the following formula (A) and/or formula (B) and found that such a compound had an excellent deterioration prevention effect.

Formula (A)

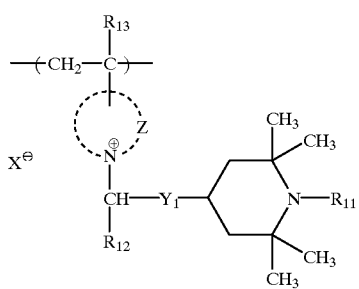

Formula (B)

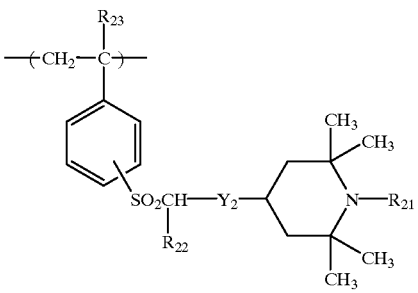

Wherein $R_{11}$ and $R_{21}$ each represents a hydrogen atom, an oxy radical group, an alkyl group, an alkenyl group, an alkoxy group or an acyl group; $R_{12}$ and $R_{22}$ each represents a hydrogen atom or an alkyl group; $Y_1$ and $Y_2$ each represents $\leftarrow CONR_4—$, $\leftarrow COO—$ or $\leftarrow CH(OH)CH_2O—$; $X^-$ represents a chlorine ion, a bromine ion, an iodine ion or a hydroxy ion; Z represents an atom group necessary for forming a 5- to 7-membered heteroring together with a nitrogen atom; $R_{13}$ and $R_{23}$ each represents a hydrogen atom, a methyl group, an ethyl group or a halogen atom; $R_4$ represents a hydrogen atom or an alkyl group having 1 to 4 carbon atoms; $\leftarrow$ represents a bond of a main chain side of the polymer.

DESCRIPTION OF THE PREFERRED EMBODIMENTS

Figure 1:
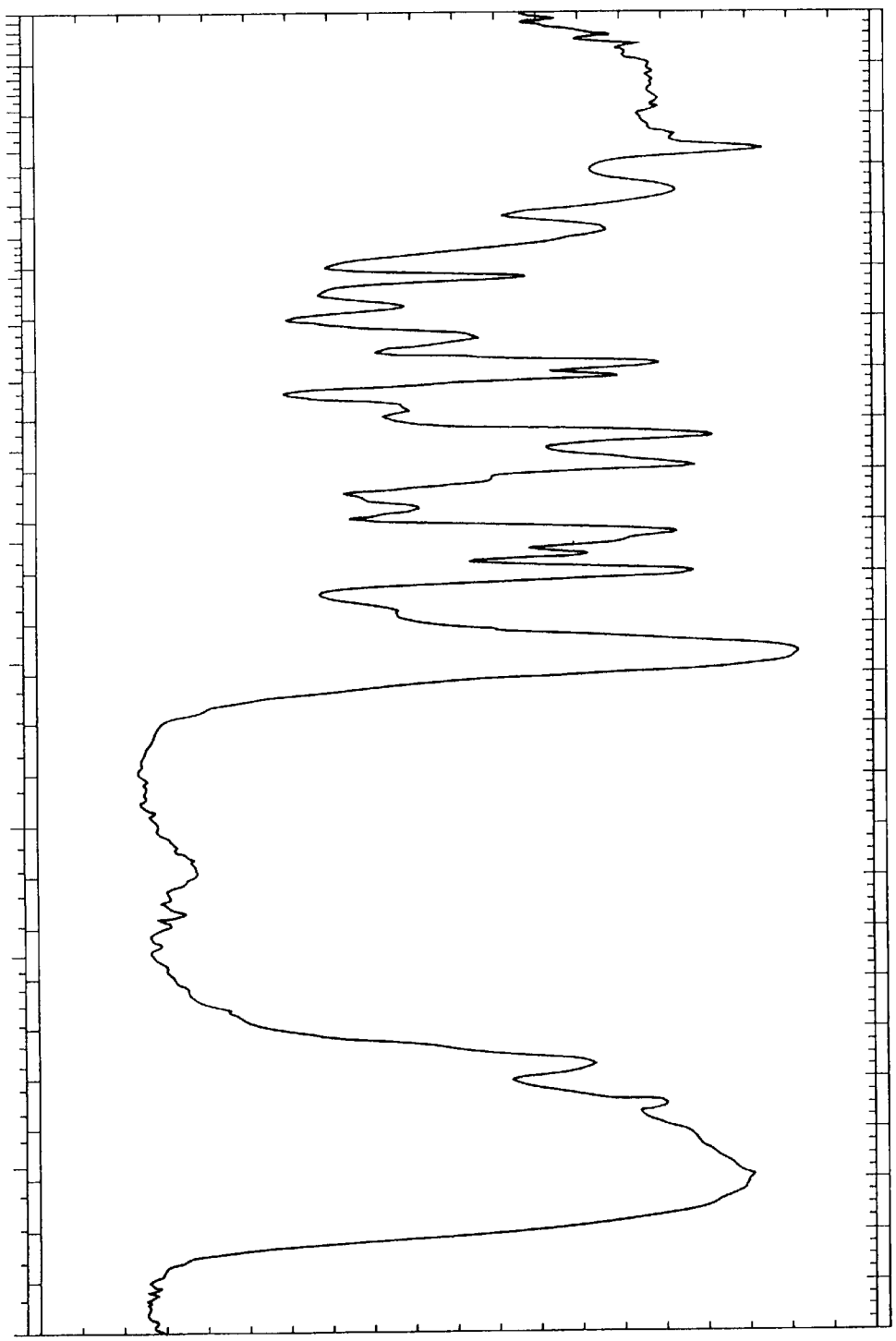
FIG. 1 shows an IR spectrum of the compound of the present invention.

Formula (A) will be further described below.

In the formula, $R_{11}$ and $R_{21}$. will be explained. Preferably, the alkyl group has 1 to 7 carbon atoms, which may be linear, branched or cyclic. The alkyl group can be unsubstituted or substituted. Examples thereof include a methyl group, an ethyl group, a benzyl group and a methoxy group. Preferably, the alkenyl group has 1 to 7 carbon atoms, which may be linear, branched or cyclic. The alkenyl group can be unsubstituted or substituted. Examples thereof include a vinyl group and an allyl group. Preferably, the alkoxy group has 1 to 8 carbon atoms, which may be linear, branched or cyclic. The alkoxy group can be unsubstituted or substituted. Examples thereof include a methoxy group, a benzyloxy group and a secondary-octyloxy group. The acyl group is preferably an alkylcarbonyl group (the alkyl part comprises 1 to 7 carbon atoms), an alkenylcarbonyl group (the alkenyl part comprises 2 to 7 carbon atoms) or an arylcarbonyl group (the aryl part comprises 6 to 8 carbon atoms), more preferably an alkylcarbonyl group (the alkyl part comprises 1 to 7 carbon atoms, which may be linear, branched or cyclic). This group can be unsubstituted or substituted and, for example, can be acetyl group, a propionyl group and an acryloyl group. In view of the effect of the present invention, $R_{11}$ and $R_{21}$ is preferably a hydrogen atom, an alkyl group or an oxy radical group, more preferably a hydrogen atom or an oxy radical group, and the most preferably an oxy radical group.

$R_{12}$ and $R_{22}$ will be explained. The alkyl group preferably has 1 to 7 carbon atoms, which may be linear, branched or cyclic. The alkyl group can be unsubstituted or substituted. Examples thereof include a methyl group, an ethyl group, an isobutyl group and a methoxyethoxy group. In view of the effect of the present invention, $R_{12}$ and $R_{22}$ is preferably a hydrogen atom.

$Y_1$, $Y_2$ and $R_4$ will be explained. The alkyl group of $R_4$ may be linear or branched and can be unsubstituted or substituted. Examples of the alkyl group include a methyl group, an ethyl group and a butyl group. In view of the effect of the present invention, $R_4$ is preferably a hydrogen atom. In view of the effect of the present invention, $Y_1$ and $Y_2$ each is preferably ←CONR$_4$— or ←CH(OH)CH$_2$O—, more preferably ←CONH—.

In view of the effect of the present invention, X$^-$ is preferably a chlorine ion, a bromine ion, an iodine ion or a hydroxy ion, more preferably a chlorine ion.

Z will be explained below. Z represents an atom group necessary for forming a 5- to 7-membered heteroring together with a nitrogen atom. The heteroring may saturated or unsaturated, and may be an aromatic ring such as a piperidine ring, pyrrolidine ring, morpholine ring, pyrazole ring or imidazole ring. As the heteroring formed with Z, an aromatic ring is preferable in view of the effect of the present invention. An aromatic ring having two nitrogen atoms in the ring is more preferable. In such a case, a heteroring preferably bonds with a polymer main chain through another N atom (not N$^+$). The most preferably, the heteroring is an imidazole ring.

$R_{13}$ and $R_{23}$ are preferably a hydrogen atom, a methyl group or an ethyl group, more preferably a hydrogen atom or a methyl group, and the most preferably a hydrogen atom.

In a case where a group in the specification of the present application includes an aliphatic site, the aliphatic site can be linear, branched or cyclic and also can be saturated or unsaturated. For example, the aliphatic site can represent an alkyl, an alkenyl, a cycloalkyl or a cycloalkenyl, which can be substituted or unsubstituted. While, in a case where a group in the specification of the present application includes an aryl site, the aryl site can be monocyclic or a fused ring and also can be substituted or unsubstituted. Further, in a case where a group includes a heteroring site, the heteroring site comprises a heteroatom (for example, nitrogen atom, sulfur atom, oxygen atom) in the ring. The heteroring site can be a saturated ring or an unsaturated ring, can be monocyclic or a fused ring, and can be unsubstituted or substituted.

In view of the effect of the present invention, in a case where $R_{11}$ represents a hydrogen atom, an oxy radical group or an alkyl group, $R_{12}$ represents a hydrogen atom, $R_{13}$ represents a hydrogen atom, $Y_1$ represents ←CONH— or ←CH(OH)CH$_2$O—, Z is an atom group necessary for forming an imidazole ring, and X$^-$ is a chlorine ion, a case wherein $R_{21}$ represents a hydrogen atom, an oxy radical group or an alkyl group, $R_{22}$ represents a hydrogen atom, $R_{23}$ represents a hydrogen atom, $Y_2$ represents ←CONH— is preferable. Further, in a case where $R_{21}$ represents an oxy radical group, $R_{12}$ represents a hydrogen atom, $R_{13}$ represents a hydrogen atom, $Y_1$ represents ←CONH— or ←CH(OH)CH$_2$O—, Z is an atom group necessary for forming an imidazole ring, and X$^-$ is a chlorine ion, a case where $R_{21}$ represents an oxy radical group, $R_{22}$ represents a hydrogen atom, $R_{23}$ represents a hydrogen atom, $Y_2$ represents ←CONH— or ←CH(OH)CH$_2$O— is the most preferable.

The substituents in the present invention may be any substitutable group. Examples thereof include an aliphatic group, an aryl group, a heterocyclic group, an acyl group, an acyloxy group, an acylamino group, an aliphatic oxy group, an aryoxy group, a heterocyclic oxy group, an aliphatic oxycarbonyl group, an aryloxycarbonyl group, a heterocyclic oxycarbonyl group, a carbamoyl group, an aliphatic sulfonyl group, an arylsulfonyl group, a heterocyclic sulfonyl group, an aliphatic sulfonyloxy group, an arylsulfonyloxy group, a heterocyclic sulfonyloxy group, a sulfamoyl group, an aliphatic sulfonamide group, an aryl sulfonamide group, a heterocyclic sulfonamide group, an aliphatic amino group, an arylamino group, a heterocyclic amino group, an aliphatic oxycarbonyl amino group, aryloxycarbonyl amino group, a heterocyclic oxycarbonyl amino group, an aliphatic sulfinyl group, an arylsulfinyl group, an aliphatic thio group, an aryl thio group, a hydroxyl group, a cyano group, a sulfo group, a carboxyl group, an aliphatic oxyamino group, an aryoxyamino group, a carbamoylamino group, a sulfamoylamino group, a halogen atom, a sulfamoylcarbamoyl group, a carbamoylsulfamoyl group, dialiphatic oxyphosphinyl group and diaryl oxyphosphinyl group.

The polymer compound of the present invention can be not only homopolymerization products of the monomer represented by the general formula (A) or (B), but also copolymerization products of the same. Further, the polymer compound of the present invention can be those having the copolymerized structures with other monomer units set forth below.

The monomer unit represented by the general formula (A) or (B) is preferably comprised in an amount of 1 to 50 mol %, more preferably 1 to 30 mol %. The other monomer units can be copolymerized in an amount of 0 to 99 mol %.

As a monomer to be copolymerized, specifically, the following monomers can be mentioned:

As acrylic acid esters, mention may be made of methyl acrylate, ethyl acrylate, n-propyl acrylate, isopropyl acrylate, n-butyl acrylate, isobutyl acrylate, sec-butyl acrylate, tert-butyl acrylate, amyl acrylate, hexyl acrylate, 2-ethylhexyl acrylate, octyl acrylate, tert-octyl acrylate, nonyl acrylate, decyl acrylate, dodecyl acrylate, tetradecyl acrylate, hexadecyl acrylate, octadecyl acrylate, eicosyl acrylate, docosyl acrylate, tetracosyl acrylate, hexacosyl acrylate, octacosyl acrylate, triacontyl acrylate, dotriacontyl acrylate, tetratriacontyl acrylate, 2-chloroethyl acrylate, 2-bromoethyl acrylate, 4-chlorobutyl acrylate, cyanoethyl acrylate, 2-acetoxyethyl acrylate, dimethylaminoethyl acrylate, benzyl acrylate, methoxybenzyl acrylate, 2-chlorocyclohexyl acrylate, cyclohexyl acrylate, furfuryl acrylate, tetrahydrofurfuryl acrylate, phenyl acrylate, 2-hydroxyethyl acrylate, 5-hydroxypentyl acrylate, 2,2-dimethyl-3-hydroxypropyl acrylate, 2-methoxyethyl acrylate, 3-methoxybutyl acrylate, 2-ethoxyethyl acrylate, 2-iso-propoxyethyl acrylate, 2-butoxyethyl acrylate, 2-(2-2-methoxyethoxy)ethyl acrylate, 2-(2-buthoxyethoxy)ethyl acrylate, methoxypolyethylene glycol acrylate (addition mol number n=9), 1-bromo-2-methoxyethyl acrylate, 1,1-dichloro-2-ethoxyethyl acrylate, etc.

As methacrylic acid esters, mention may be made of methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, hexyl methacrylate, octyl methacrylate, nonyl methacrylate, decyl methacrylate, dodecyl methacrylate, tetradecyl methacrylate, hexadecyl methacrylate, octadecyl methacrylate, eicosyl methacrylate, docosyl methacrylate, tetracosyl methacrylate, hexacosyl methacrylate, octacosyl methacrylate, triacontyl methacrylate, dotriacontyl methacrylate, tetratriacontyl methacrylate, cyclohexyl methacrylate, benzyl methacrylate, chlorobenzyl methacrylate, octyl methacrylate, sulfopropyl methacrylate, N-ethyl-N-phenylaminoethyl methacrylate, 2-(3-phenoxypropyloxy) ethylmethacrylate, dimethylaminophenoxyethyl methacrylate, furfuryl methacrylate, tetrahydrofurfuryl methacrylate, phenyl methacrylate, cresyl methacrylate, naphthyl methacrylate, 2-hydroxyethyl methacrylate, 4-hydroxybutyl methacrylate, triethylene glycol monomethacrylate, dipropylene glycol monomethacrylate, 2-methoxyethyl methacrylate, 3-methoxybutyl methacrylate, 2-acetoxyethyl methacrylate, 2-acetacetoxyethyl methacrylate, 2-ethoxyethyl methacrylate, 2-iso-propoxyethyl methacrylate, 2-butoxyethyl methacrylate, 2-(2-methoxyethoxy)ethyl methacrylate, 2-(2-ethoxyethoxy)ethyl methacrylate, 2-(2-buthoxyethoxy)ethyl methacrylate, methoxypolyethylene glycol methacrylate (addition mol number n=6), allyl methacrylate, N,N,N-trimethyl-N-2-ethylmethylammonium chloride, etc.

As vinyl esters, mention may be made of vinyl acetate, vinyl propionate, vinyl butylate, vinyl isobutylate, vinyl caproate, vinyl chloroacetate, vinyl methoxyacetate, vinyl phenyl acetate, vinyl benzoate, vinyl salicylate, etc.

As olefines, mention may be made of dichloropentadiene, ethylene, propylene, 1-butene, 1-pentene, vinyl chloride, vinylidene chloride, isoprene, chloroprene, butadiene, 2,3-dimethyl butadiene, etc.

As styrenes, mention may be made of styrene, methylstyrene, dimethylstyrene, trimethylstyrene, ethylstyrene, isopropylstyrene, chloromethyl styrene, methoxystyrene, acetoxystyrene, chlorostyrene, dichlorostyrene, bromstyrene, trifluoromethyl styrene, methyl vinyl benzoate, etc.

As crotonic acid esters, butyl crotonate, hexyl crotonate, etc. can be mentioned.

As itaconic acid diesters, dimethyl itaconate, diethyl itaconate, dibutyl itaconate, etc. can be mentioned.

As maleic acid dieseters, diethyl maleate, dimethyl maleate, dibutyl maleate, etc. can be mentioned.

As fumaric acid diesters, for example, diethyl fumarate, dimethyl fumarate, dibutyl fumarate, etc. can be mentioned.

As acrylamides, mention may be made of acrylamide, methyl acrylamide, ethyl acrylamide, propyl acrylamide, butyl acrylamide, tert-butyl acrylamide, cyclohexyl acrylamide, benzyl acrylamide, hydroxymethyl acrylamide, methoxyethyl acrylamide, dimethylaminoethyl acrylamide, phenyl acrylamide, dimethyl acrylamide, diethyl acrylamide, β-cyanoethyl acrylamide, N-(2-acetacetoxyethyl)acrylamide, etc.

As methacrylamides, mention may be made of methacrylamide, methyl methacrylamide, ethyl methacrylamide, propyl methacrylamide, butyl methacrylamide, tert-butyl methacrylamide, cyclohexyl methacrylamide, benzyl methacrylamide, hydroxymethyl methacrylamide, methoxyethyl methacrylamide, dimethylaminoethyl methacrylamide, phenyl methacrylamide, dimethyl methacrylamide, diethyl methacrylamide, β-cyanoethyl methacrylamide, N-(2-acetacetoxyethyl) methacrylamide, etc.

As unsaturated carboxylic acids, mention may be made of acrylic acid, methacrylic acid, $CH_2=CHCONHCH_2CH_2COOH$, $CH_2=CHCOOCH_2CH_2COOH$, $CH_2=CHC_6H_4COOH(p)$, $CH_2=CCH_3CONHCH_2CH_2COOH$, $CH_2=CCH_3COOC_6H_4COOH(p)$, $CH_2=CCH_3CONHCH_2CH_2OCOC_6H_4COOH(p)$, $CH_2=CHCOOCH_2CH_2OCOC_6H_4COOH(o)$, $CH_2=CCH_3COOCH_2CH_2OCOC_6H_4COOH(o)$, $CH_2=CHCONHC_6H_4COOH(o)$, $CH_2=CHCOOCH_2CH_2OCOCH_2CH_2COOH$, $CH_2=CCH_3CONHC_4H_4COOH(p)$, $CH_2=CCH_3COOCH_2CH_2OCOCH_2CH_2COOH$, (α-chloroacyric acid, etc.

As allyl compound, mention may be made of allyl acetate, allyl caproate, allyl laurate, allyl benzoate, etc.

As vinyl ethers, mention may be made of methyl vinyl ether, butyl vinyl ether, hexyl vinyl ether, methoxyethyl vinyl ether, etc.

As vinyl ketones, mention may be made of methyl vinyl ketone, phenyl vinyl ketone, methoxyethyl vinyl ketone, etc.

As vinyl heterocyclic compound, vinyl pyridine, N-vinyl imidazole, N-vinyl oxazolidone, N-vinyl triazole, N-vinyl pyrrolidone, etc. can be mentioned.

As glycidyl esters, mention may be made of glycidyl acrylate, glycidyl methacrylate, etc.

As unsaturated nitriles, acrylonitrile, methacrylonitrile, etc. can be mentioned.

As monofunctional monomers, divinylbenzene, methylenebisacrylamide, ethylene glycol dimethacrylate, etc. can be mentioned.

The polymer compound of the present invention may have the structure copolymerized with one kind of the above-described monomer units or copolymerized with two or more monomer units. As the copolymerized structures, mention may be made of preferably vinyl heterocyclic compounds, vinyl ethers, styrene sulfonic acid, styrene sulfinic acid, acrylamides and methacrylamides, more preferably vinyl heterocyclic compounds, styrene sulfonic acid and styrene sulfinic acid, and the most preferably vinyl heterocyclic compounds and styrene sulfinic acid. AS the vinyl heterocyclic compounds, N-vinyl imidazole, N-vinylpyrrolidone are preferable.

In view of the effect of the present invention, the polymer compound of the present invention preferably comprises not only a monomer unit represented by the general formula (A) and/or the general formula (B), but also comprises other one or more, preferably two or more kinds of monomer units. The most preferably, the polymer compound has a structure copolymerized with N-vinyl imidazole and/or N-vinyl pyrrolidone and/or styrene sulfinic acid and/or styrene sulfonic acid.

The average weight molecular weight of the polymer compound comprising a monomer unit represented by the general formula (A) and/or the general formula (B) is generally 1,000 to 1,000,000, preferably 2,000 to 750,000, and more preferably 3,000 to 500,000. These values, however, are not critical for obtaining the effects of the present invention.

Definite compounds of the present invention will be set forth below. However, the compounds of the present invention are not limited thereto. The proportion of a monomer unit is represented in terms of mol %.

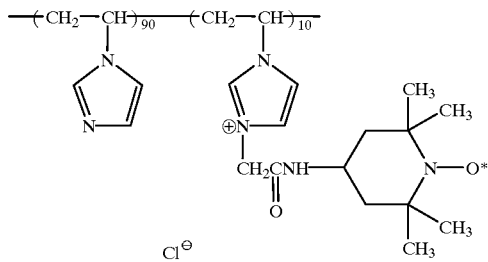
(1)
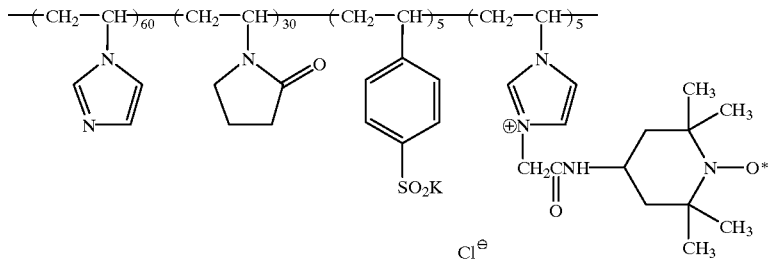
(2)
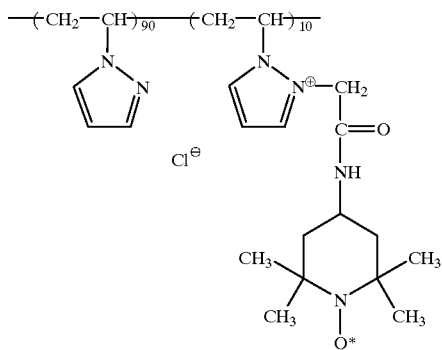
(3)
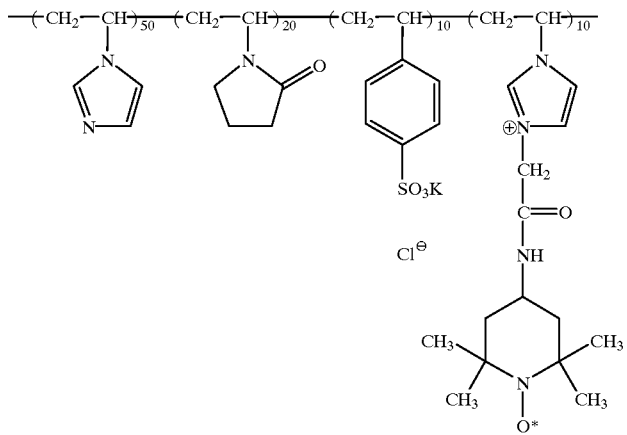
(4)

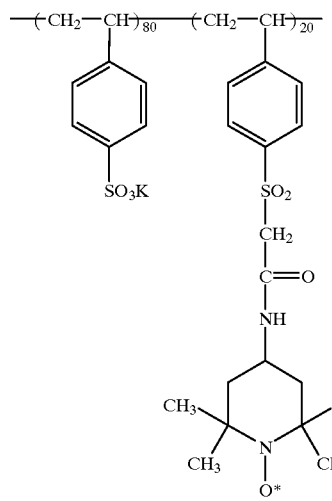
(5)
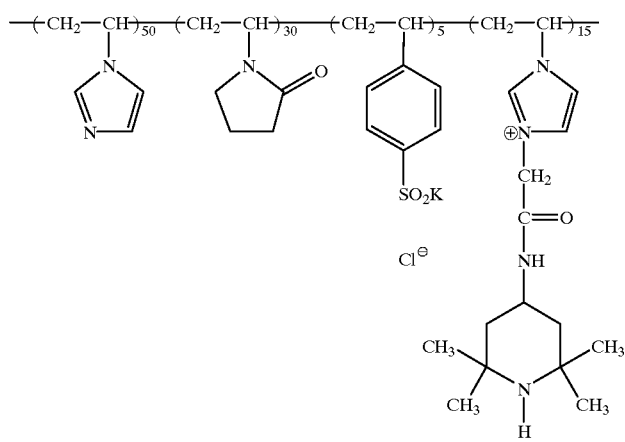
(6)
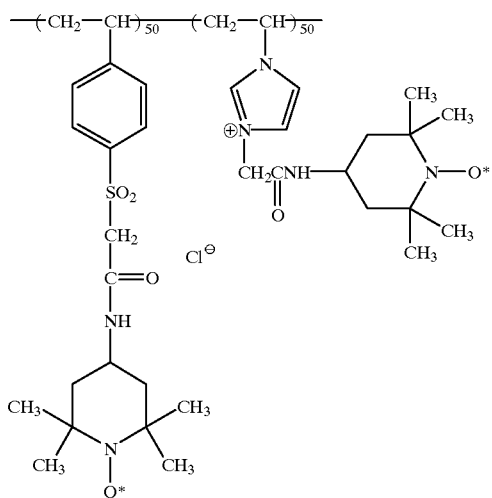
(7)

-continued
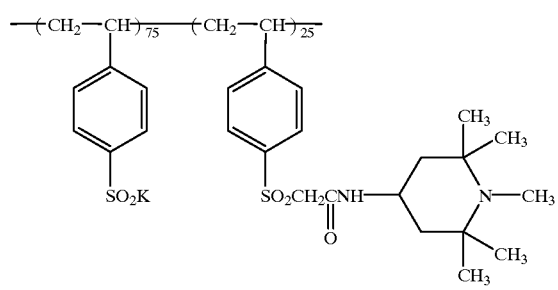
(8)
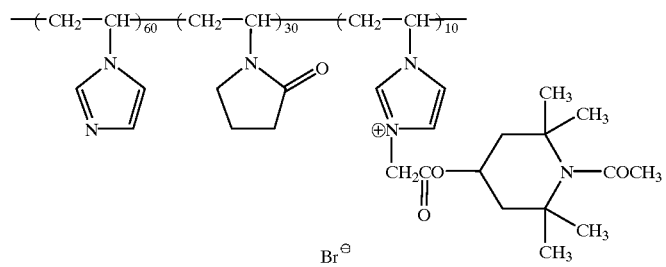
(9)
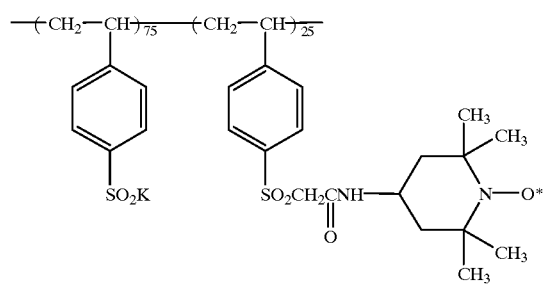
(10)
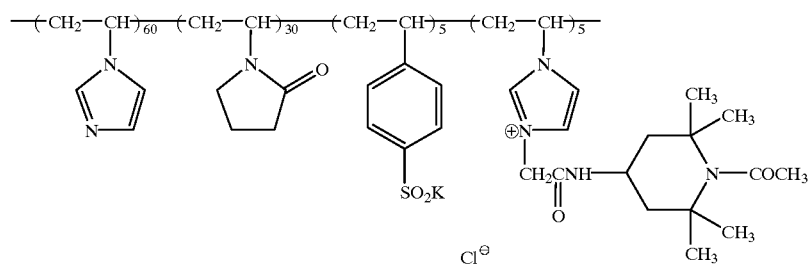
(11)
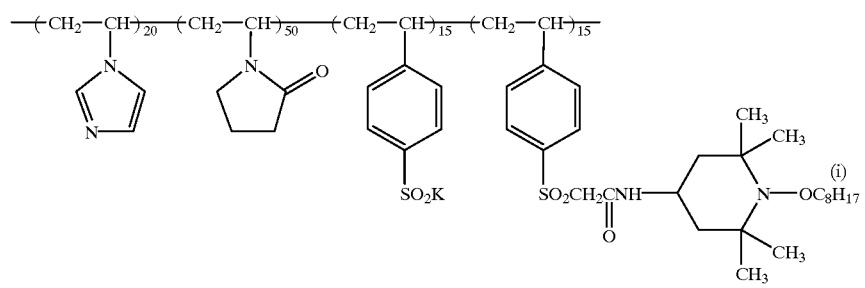
(12)

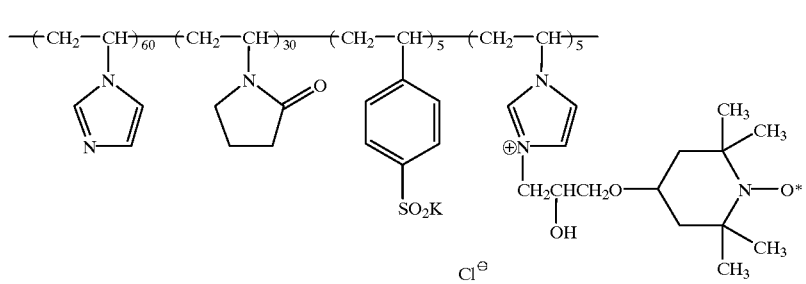

(13)

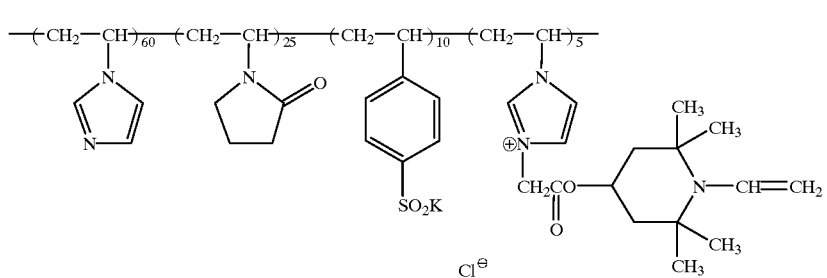

(14)

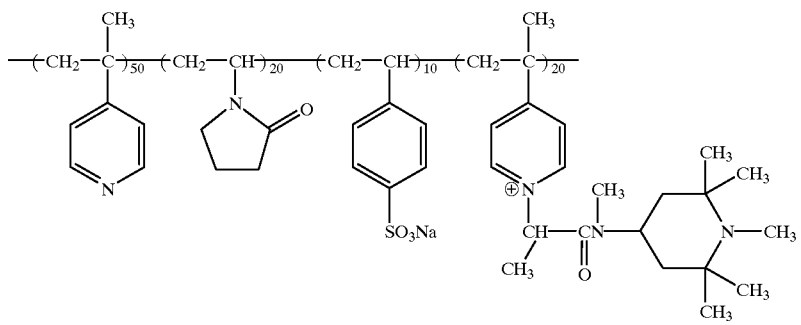

(15)

The polymer compound comprising a monomer unit represented by the general formula (A) and/or the general formula (B) of the present invention can be synthesized by homopolymerization of a vinyl compound corresponding to the general formula (A) and/or the general formula (B) which was previously prepared by the synthesis, or by copolymerization of the same with another monomer unit to be copolymerized. Alternatively, the polymer compound of the present invention can be readily synthesized by homopolymerization of a vinyl heterocyclic compound corresponding to the general formula (A) and/or the general formula (B), having Z and a nitrogen atom, and being able to be quaternarized (previously prepared by the synthesis) or by homopolymerization of previously prepared styrene sulfinic acid, or by copolymerization of the same with another monomer unit to be copolymerized, then reacting the resulting polymer compound with a tetramethylpiperidine-bonded alkyl halide or epoxy compound. As the polymerization method, usual polymerization methods such as solution polymerization, dispersion polymerization, suspension polymerization and emulsion polymerization are used.

As a raw material of the tetramethyl piperidine skeleton, 4-amino-2,2,6,6-tetramethyl piperidine, 4-hydroxy-2,2,6,6-tetramethyl piperidine, etc. are commercially available and, therefore, can be readily obtained. A quaternary salt formation agent containing 2,2,6,6-tetramethyl piperidine can be synthesized using these materials according to an amidation reaction, an esterification reaction, an oxidation reaction, an alkylation reaction, etc.

The polymer compound of the present invention can be used with an appropriate diluent, a solvent, a carrier or the like. They can be used alone or in any combination thereof. Known deterioration prevention agent and fading prevention agent also can be used together. In such a case, the deterioration prevention effect sometimes can be remarkably improved. As the known deterioration prevention agent and fading prevention agent can be used together, hydroquinones, chromans, alkylphenols, alkoxyphenols, alkoxybenzenes, anilines, indanes, etc. can be mentioned.

The present invention will be described in detail by way of, but by no means limited to, Examples below.

EXAMPLE 1

Synthesis of Exemplified Compound (2)

The exemplified compound (2) was synthesized according to the following route:

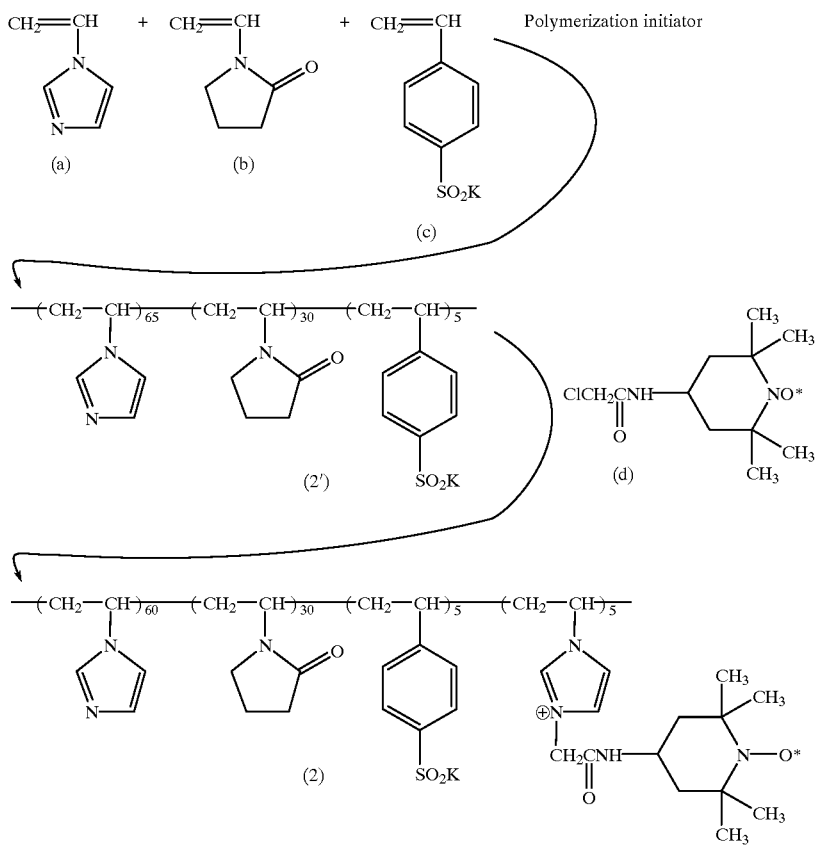

To (a) 61.3 g, (b) 29.8 g, and (c) 10.3 g was added 140 ml of water to form a solution. Then, 3 g of a polymerization initiator, 1,1'-azobis(1-cyclohexanecarbonitrile) dissolved in 70 ml of water was dropwise added to the resulting solution for 60 minutes with stirring at 70° C. under a nitrogen stream. The solution thus obtained was stirred at 70° C. for further 4 hours. Thereafter, 90ml of water was added to obtain a solution (2'). This solution was kept at 70° C. and added with 12.4 g of (d) (commercially available product), then the resulting mixture was stirred at 70° C. for 3 hours, successively cooled to 25° C. to obtain a solution (2). The resulting aqueous solution was dialyzed using a dialysis membrane Spectra/Por (the molecular weight cut off: 6000 to 8000) manufactured by Toyobo Engineering and running water for two days and nights, then concentrated to 400 g.

The concentrated product obtained was poured into 2000 ml of acetone, then acetone was removed by decantation, further 1000 ml of acetone was added. The resulting mixture was pulverized by an agitator, then filtered, and washed by pouring acetone to obtain 105 g of pale orange powder (2). IR spectrum of the compound obtained is shown in FIG. 1.

EXAMPLE 2

Synthesis of Exemplified Compound (4)

The exemplified compound (4) was synthesized according to the following route:

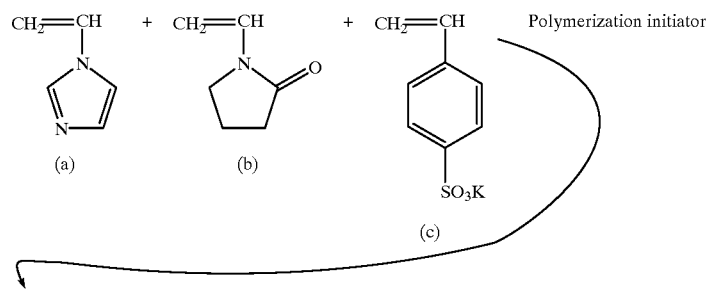

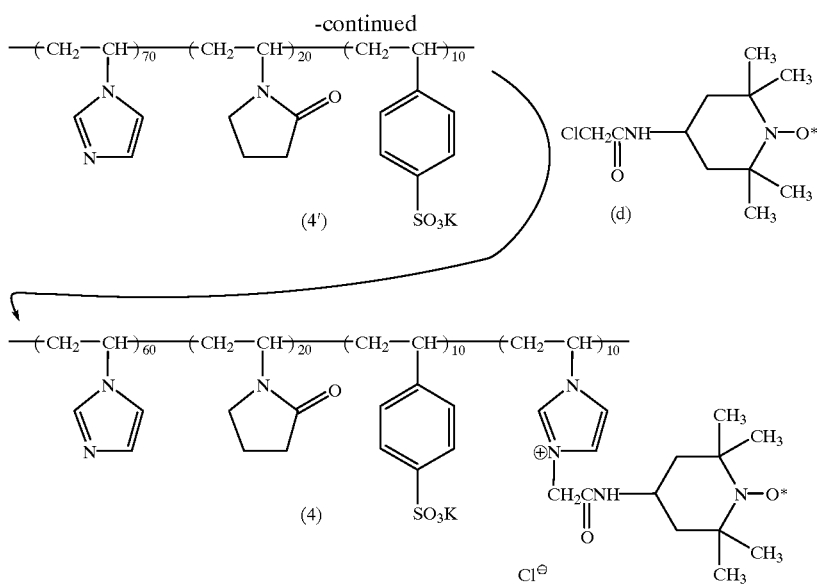

Figure 2:
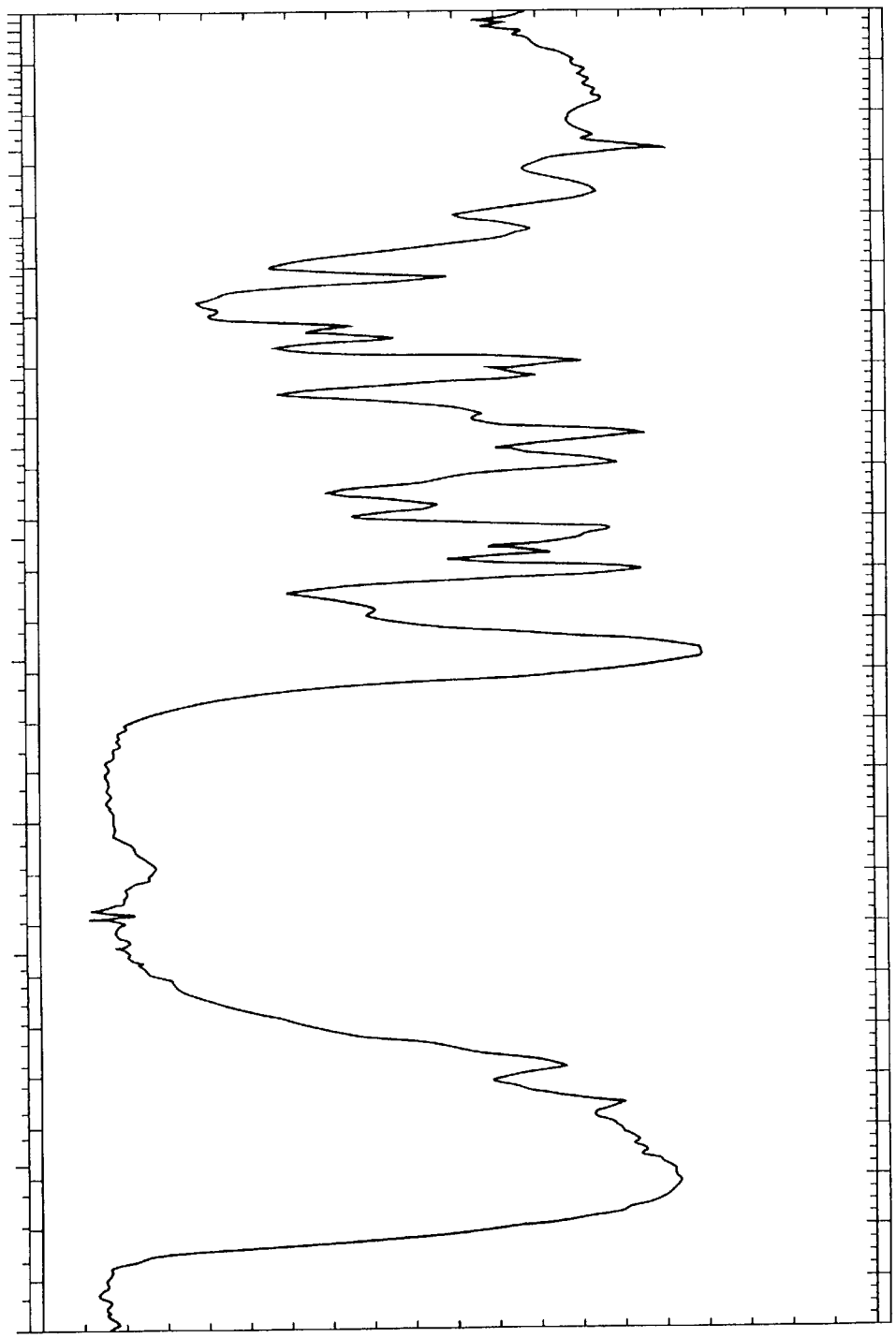
FIG. 2 shows an IR spectrum of the compound of the present invention.

To (a) 66.0 g, (b) 19.9 g, and (e) 22.3 g was added 150 ml of water to form a solution. Then, 3 g of a polymerization initiator, 1,1'-azobis(l-cyclohexanecarbonitrile) dissolved in 70 ml of water was dropwise added to the resulting solution for 60 minutes with stirring at 70° C. under a nitrogen stream. The solution thus obtained was stirred at 70° C. for further 4 hours. Thereafter, 90 ml of water was added to obtain a solution (4'). This solution was kept at 70° C. and added with 12.4 g of (d) (commercially available product), then the resulting mixture was stirred at 70° C. for 3 hours, successively cooled to 25° C. to obtain a solution (4). The resulting aqueous solution was dialyzed using a dialysis member Spectra/Por (the molecular weight cut off: 6000 to 8000) manufactured by Toyobo Engineering and running water for two days and nights, then concentrated to 400 g. The concentrated product obtained was poured into 2000 ml of acetone, then acetone was removed by decantation, further 1000 ml of acetone was added. The resulting mixture was pulverized by an agitator, then filtered, and washed by pouring acetone to obtain 107 g of pale orange powder (4). The yield was 88.7% and the water content was 10.2%. IR spectrum of the compound obtained is shown in FIG. 2.

EXAMPLE 3

Synthesis of Exemplified Compound (6)

The exemplified compound (6) was synthesized according to the following route:

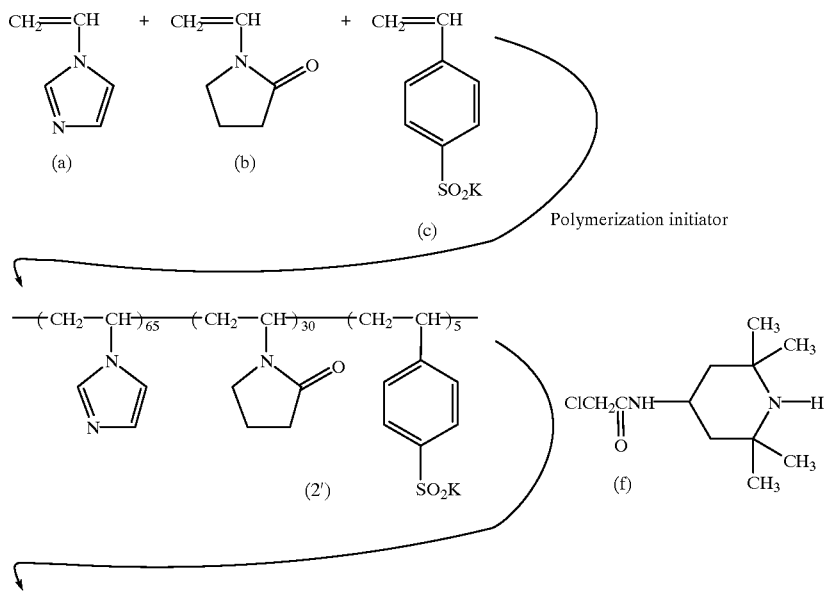

-continued

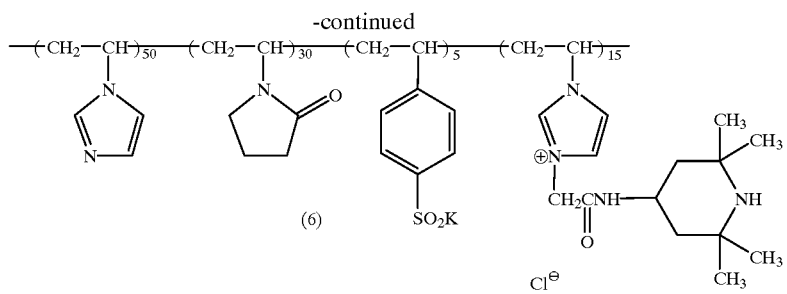

(6)

Firstly, the synthesis of (f) will be described. 4-amino-2,2,6,6-tetramethylpiperidine 34.0 g was dissolved in 100 ml of water and chloroacetyl chloride 27.0 g was dropwise added thereto with stirring at 10° C. or less for 60 minutes. Stirring was effected for further 30 minutes. Thereafter, an aqueous solution of 9.6 g of sodium hydroxide in 30 ml of water was dropwise added thereto at 20° C. or less for 15 minutes. Further, stirring was effected for 30 minutes. Thereafter, the deposited crystal was filtered and washed with 100 ml of cold water. The crystal obtained was dried to obtain white crystal. The yield was 42.2 g (83.4%) and the melting point was 114 to 116° C.

Figure 3:
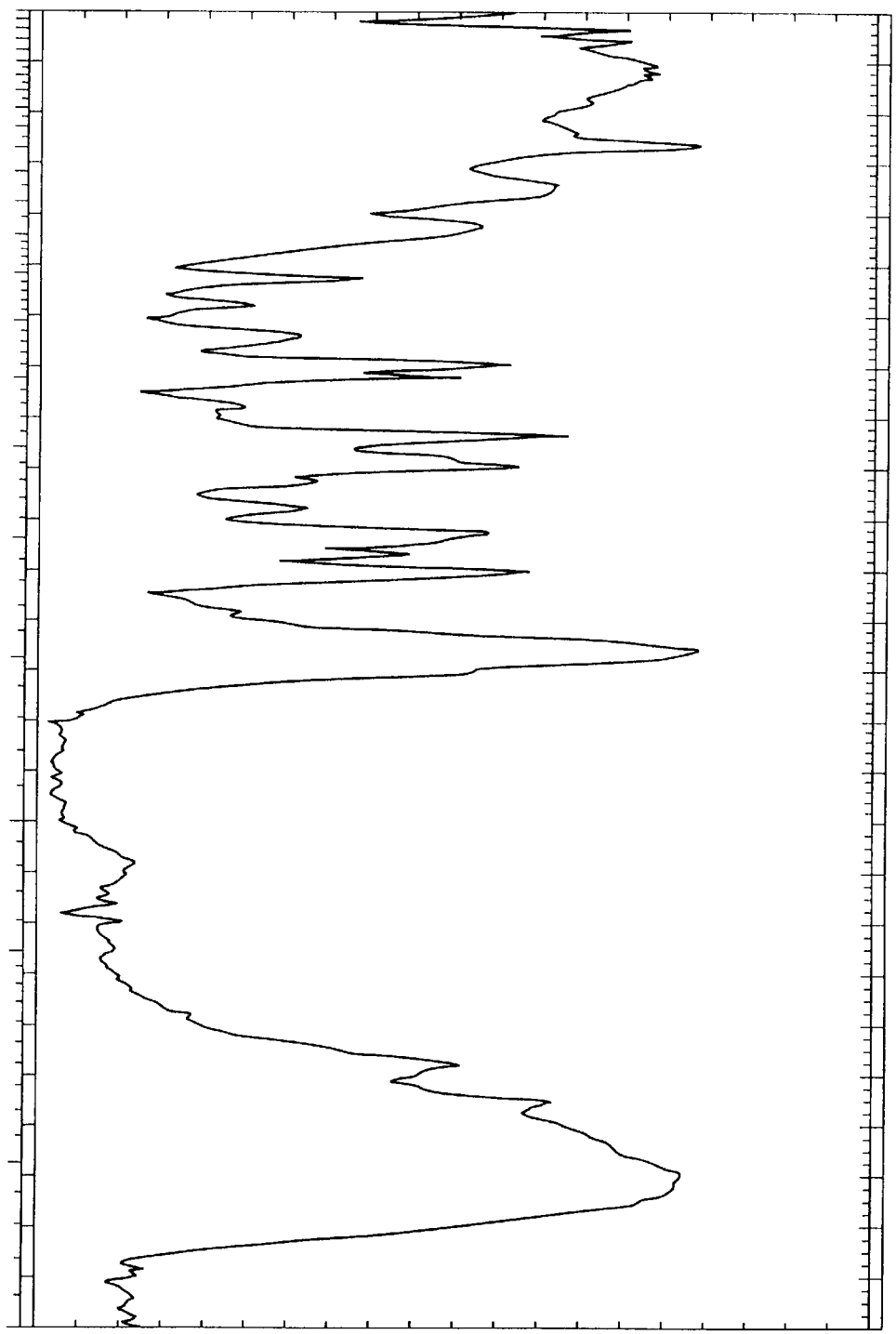
FIG. 3 shows an IR spectrum of the compound of the present invention.

Next, aqueous solution (2') was obtained as in Example 1. This aqueous solution was kept at 70° C. and 34.8 g of (f) was added thereto. The resulting solution was stirred at 70° C. for 3 hours, then cooled to 25° C., whereby an aqueous solution (6) was obtained. The resulting aqueous solution was dialyzed using a dialysis Spectra/Por (the molecular weight cut off: 6000 to 8000) manufactured by Toyobo Engineering and running water for two days and nights, then concentrated to 400 g. The concentrated product obtained was poured into 2000 ml of acetone, then acetone was removed by decantation, further 1000 ml of acetone was added. The resulting mixture was pulverized by an agitator, then filtered, and washed by pouring acetone to obtain 125 g of white powder (6). The yield was 91.98% and the water content was 7.3%. IR spectrum of the compound obtained is shown in FIG. 3.

EXAMPLE 4

Synthesis of Exemplified Compound (10)

The exemplified compound (10) was synthesized according to the following route:

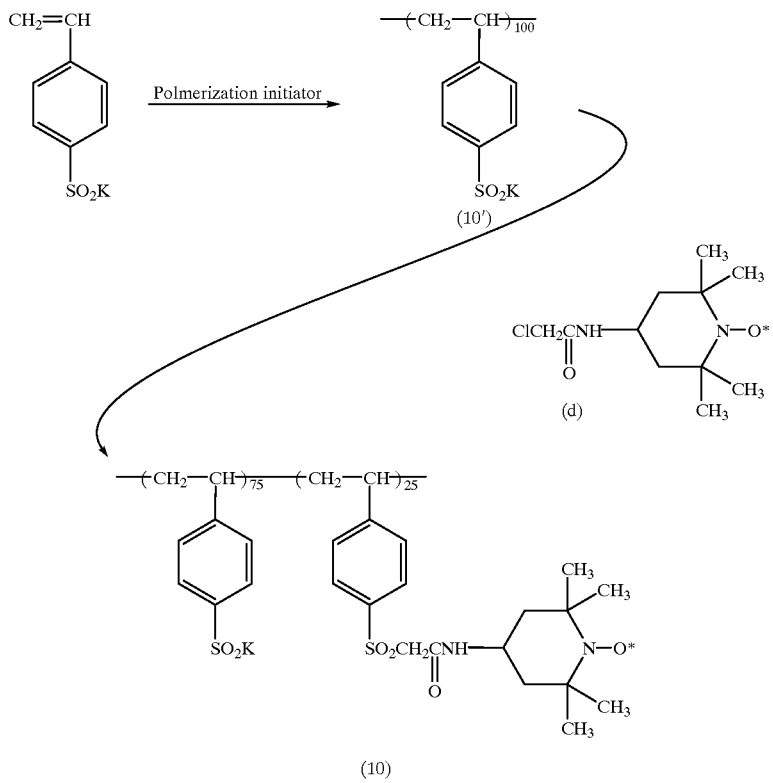

Figure 4:
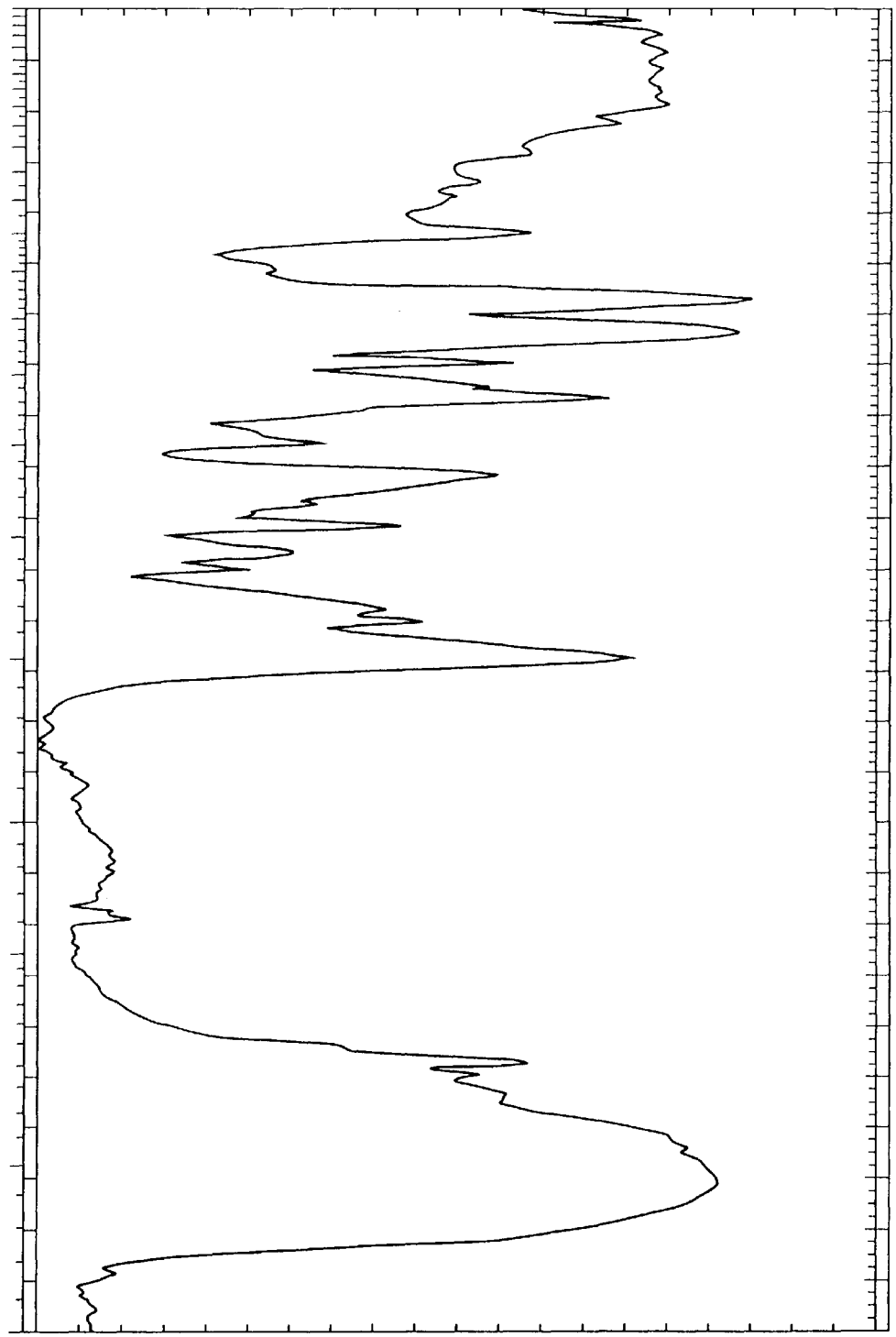
FIG. 4 shows an IR spectrum of the compound of the present invention.

To (c) 41.3 g was added 80 ml of water to form a solution. Then, 3 g of a polymerization initiator, 1,1'-azobis(1-cyclohexanecarbonitrile) dissolved in 70 ml of water was dropwise added to the resulting solution for 60 minutes with stirring at 70° C. under a nitrogen stream. The solution thus obtained was stirred at 70° C. for further 4 hours. Thereafter, 120 ml of water was added to obtain a solution (10'). This solution was kept at 70° C. and added with 12.4 g of (d) (commercially available product), then the resulting mixture was stirred at 70° C. for 3 hours, successively cooled to 25° C. to obtain a solution (10). The resulting aqueous solution was dialyzed using a dialysis membrane Spectra/Por (the molecular weight cut off: 6000 to 8000) manufactured by Toyobo Engineering and running water for two days and nights, then concentrated to about 200 g. The concentrated product obtained was poured into 1000 ml of acetone, thereafter, the deposited solid was filtered and washed by pouring acetone to obtain 48 g of pale orange powder (10). The yield was 89.4% and the water content was 8.6%. IR spectrum of the compound obtained is shown in FIG. 4.

EXAMPLE 5

Firstly, a method for preparing a dye-fixing element will be set forth below.

A method for preparing a dispersion of a fluorescent brightener and a stain prevention agent will be set forth below.

A fluorescent brightener (1) 25 g, a stain prevention agent (1) 32 g and an anionic surfactant (2) 10 g were dissolved in a high boiling point organic solvent (1) 690 g and ethyl acetate 250 ml. Then, the resulting solution was added to 25% aqueous gelatin solution 1200 ml, which was dispersed by a homogenizer at 1250 rpm for 20 minutes. 300 ml of water was further added thereto and the resulting mixture was stirred to obtain an uniform dispersion.

Next, a method for preparing latex will be described below.

Gelatin 20 g and a water-soluble polymer (3) 30 g were dissolved in 200 ml of water at 50° C. Thereafter, the temperature of the resulting solution was lowered to 40° C. and a latex dispersion (1) 117 g was added thereto and stirred. The resulting product in a dissolution state was filtered through a 30 μm filter to obtain a uniform dispersion. The dye-fixing element R101 having a construction shown in Table 1 was prepared.
Water-soluble polymer (1) Sumikagel L5-H (manufactured by Sumitomo Kagaku K.K.)
Water-soluble polymer (2) Copper Karageenan (manufactured by Tito K.K.)
Water-soluble polymer (3) Dextran (Mw. 70,000)
Latex dispersion (1) Nipol LX814 (manufactured by Japan Zeon K.K.)
Matting agent (1) SYLOID79 (manufactured by Fuji Devison Kagaku K.K.)

Fluorescent brightener (1)

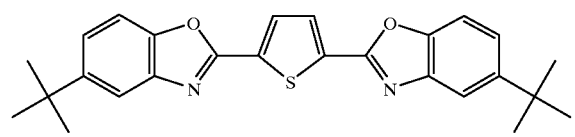

-continued

Stain preventiom agent (1)

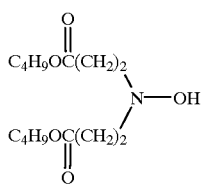

Mordant (1)

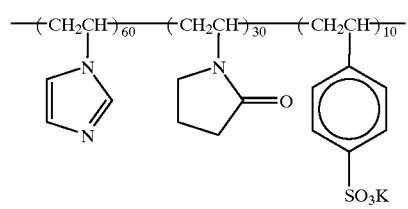

Film-hardening agent (1)

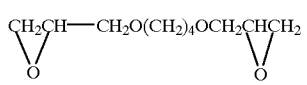

Anionic surfactant (1)

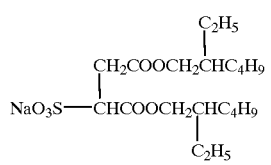

Anionic surfactant (2)

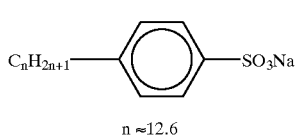

n ≈12.6

Anionic surfactant (3)

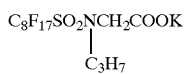

Amphoteric surfactant (4)

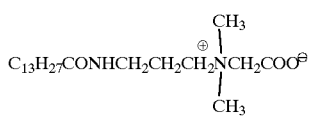

High Boiling Point Solvent (1)

Empara 40 (manufactured by Ajinomoto K.K.)

Comparative compound (a)

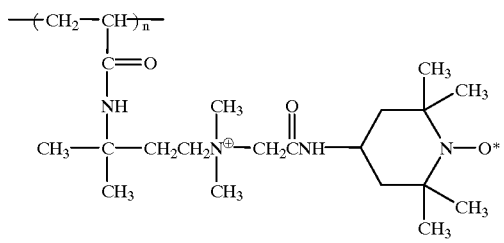

R102 to R106 were prepared as in R101 except for changing the mordant in the second layer to one shown in Table A. The amount of the mordant to be added is the same as that of R101. R107 is a sample wherein the compound of Table A is additionally added in an amount of 230 mg/m$^2$ to the second layer of R101.

The above-described dye-fixing element was combined with a photosensitive element commercially available under the name of PICTRO STAT200 PS DONOR PS-DS to obtain a test image using a color copy machine also commercially available under a name of PICTRO STAT200.

An original picture having full color was scanning-exposed through a slit, then the exposed photosensitive element was immersed in water kept at 40° C. for 2.5 seconds, successively squeezed by a roller, and immediately thereafter, laminated in such a manner that the dye-fixing element may be contacted with a film surface. Then heating was effected for 17 seconds using a heat drum controlled to make the water-absorbed film surface have a temperature of 80° C., thereafter, the photosensitive element was pealed off the dye-fixing element, whereby a clear color image corresponding to the original picture could be obtained on the dye-fixing element.

TABLE 1

Construction of dye-fixing element R101

| Layer No. | Additive | Coated amount (mg/m$^2$) |
|---|---|---|
| Forth layer | Water-soluble polymer(1) | 200 |
| | Water-soluble polymer(2) | 60 |
| | Potassium nitrate | 30 |
| | Anionic surfactant(1) | 8 |
| | Anionic surfactant(3) | 7 |
| | Matting agent(1) | 10 |
| Third layer | Gelatin | 250 |
| | Water-soluble polymer(1) | 30 |
| | Amphoteric surfactant(4) | 27 |
| | Film-hardening agent(1) | 190 |
| Second layer | Gelatin | 1400 |
| | Water-soluble polymer(1) | 130 |
| | Water-soluble polymer(3) | 660 |
| | Latex dispersion(1) | 1180 |
| | High-boiling point solvent(1) | 690 |
| | Fluorescent-brightener(1) | 25 |
| | Mordant(1) | 2350 |
| | Anionic surfactant(2) | 10 |
| | Guanidine salt of picolinic acid | 2900 |
| | Stain prevention agent(1) | 32 |
| First layer | Gelatin | 190 |
| | Water-soluble polymer(1) | 10 |
| | Anionic surfactant(1) | 10 |
| | Amphoteric surfactant(4) | 27 |
| | Film-hardening agent(1) | 190 |

Support(1): paper support laminated with polyethylene(thickness 206 μm)

The coated amount of the latex dispersion (1) is the coated amount of the solid latex.

TABLE 2

Support(1):

| Name of layer | Composition | | Film thickness (μm) |
|---|---|---|---|
| Surface PE layer | Gelatin | | 0.1 |
| Surface PE layer (glossy) | Low-density polyethylene (density 0.923): | 89.2 parts | 35.0 |
| | Surface-treated titanium oxide: | 10.0 parts | |
| | ultramarine: | 0.8 parts | |
| Pulp layer | High-quality paper (LBKP/NBKP = 1/1 density 1.080) | | 140.8 |
| Back surface PE layer (mat) | High-density polyethylene (density 0.960) | | 30.0 |
| Back surface | Gelatin | | 0.05 |
| subbing layer | Colloidal silica | | 0.05 |
| | | | 206.0 |

Respective samples R101 to R107 wherein a color image was formed were exposed to a xenon tester (illumination intensity 200,000 lux) for eight days through an ultraviolet ray-absorbing filter manufactured by Fuji Photo. Film K.K. which cuts light of 400 nm or less. The evaluation was effected according to a color density residual rate at a cyan initial density of 2.0 in gray.

The determination was effected using a Fuji automatic densitometer. The results obtained were shown in Table A.

TABLE A

| Dye-fixing element | Antioxidant | Color residual rate | note |
|---|---|---|---|
| R101 | None(only mordant (1)) | 78% | Comparative Example |
| R102 | Comparative compound (a) | 85% | Comparative Example |
| R103 | Present compound (2) | 95% | Present invention |
| R104 | Present compound (4) | 92% | " |
| R105 | Present compound (6) | 93% | " |
| R106 | Present compound (8) | 89% | " |
| R107 | Present compound (10) | 90% | " |

As can be seen from Table A, the compounds of the present invention have an extremely excellent anti-oxidation property (fading prevention effect).

A novel polymer compound comprising 2,2,6,6-tetramethylpiperidine derivative useful as an antioxidant.

What is claimed is:

1. A polymer compound comprising at least one of the monomer units represented by the following formula (A) or formula (B):

(A)

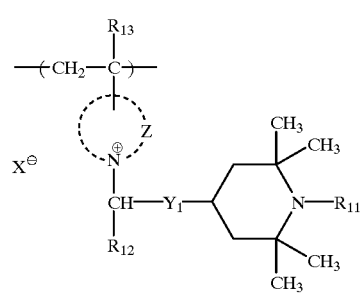

(B)

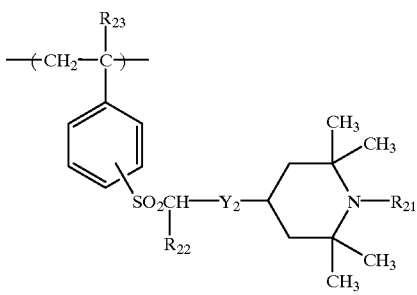

wherein $R_{11}$ and $R_{21}$ each represents a hydrogen atom, an oxy radical group, an alkyl group, an alkenyl group, an alkoxy group or an acyl group; $R_{12}$ and $R_{22}$ each represents a hydrogen atom or an alkyl group; $Y_1$ and $Y_2$ each represents ←$CONR_4$—, ←COO— or ←$CH(OH)CH_2O$—; $X^-$ represents a chlorine ion, a bromine ion, an iodine ion or a hydroxy ion; Z represents an atom group which together with the nitrogen atom forms a ring selected from the group consisting of a piperidine ring, pyrrolidine ring, a morpholine ring, a pyrazole ring, a pyridine ring and an imidazole ring; $R_{13}$ and $R_{23}$; each represents a hydrogen atom, a methyl croup, an ethyl group or a halogen atom; $R_4$ represents a hydrogen atom or an alkyl group having 1 to 4 carbon atoms; and represents a bond to the main chain side of the polymer.

2. A polymer compound according to claim 1, wherein $R_{11}$ and $R_{21}$ each represents a hydrogen atom, an alkyl group or an oxy radical group.

3. A polymer compound according to claim 1, wherein $R_{12}$ and $R_{22}$ each represents a hydrogen atom.

4. A polymer compound according to claim 1, wherein $Y_1$ and $Y_2$ each represents ←$CONR_4$—, or ←$CH(OH)CH_2O$—.

5. A polymer compound according to claim 1, wherein $X^-$ represents a chlorine ion, a bromine ion, or a hydroxy ion.

6. A polymer compound according to claim 1, wherein Z represents an aromatic ring.

7. A polymer compound according to claim 1, wherein $R_{13}$ and $R_{23}$ each represents a hydrogen atom, a methyl group, or an ethyl group.

8. A polymer compound according to claim 1, wherein $R_{11}$ represents a hydrogen atom, an oxy radical group or an alkyl group; $R_{12}$ represents a hydrogen atom; $R_{13}$ represents a hydrogen atom; $Y_1$ represents ←CONH— or ←$CH(OH)CH_2O$—; Z is an atom group which together with the nitrogen atom forms an imidazole ring; $X^-$ is a chlorine ion; $R_{21}$ represents a hydrogen atom, an oxy radical group or an alkyl group; $R_{22}$ represents a hydrogen atom; $R_{23}$ represents a hydrogen atom; and $Y_2$ represents ←CONH—.

9. A polymer compound according to claim 1, wherein $R_{11}$ represents an oxy radical group; $R_{12}$ represents a hydrogen atom; $R_{13}$ represents a hydrogen atom; $Y_1$ represents ←CONH— or ←$CH(OH)CH_2O$—; Z is an atom group which together with the nitrogen atom forms an imidazole ring; $X^-$ is a chlorine ion; $R_{21}$ represents an oxy radical group; $R_{22}$ represents a hydrogen atom; $R_{23}$ represents a hydrogen atom; and $Y_2$ represents ←CONH— or ←$CH(OH)CH_2O$—.

10. A polymer compound according to claim 1, which comprises at least one of the monomer units represented by formula (A) and formula (B) in an amount of 1 to 50 mol %.

11. A polymer compound according to claim 1, wherein Z together with the nitrogen atom forms a piperidine ring.

12. A polymer compound according to claim 1, wherein Z together with the nitrogen atom forms a pyrrolidine ring.

13. A polymer compound according to claim 1, wherein Z together with the nitrogen atom forms a morpholine ring.

14. A polymer compound according to claim 1, wherein Z together with the nitrogen atom forms a pyrazole ring.

15. A polymer compound according to claim 1, wherein Z together with the nitrogen atom forms a pyridine ring.

16. A polymer compound according to claim 1, wherein Z together with the nitrogen atom forms an imidazole ring.

* * * * *